United States Patent
Tengli et al.

(10) Patent No.: US 8,768,926 B2
(45) Date of Patent: Jul. 1, 2014

(54) TECHNIQUES FOR CATEGORIZING WEB PAGES

(75) Inventors: Ashwin Tengli, Karnataka (IN); Rajeev Rastogi, Karnataka (IN); Jeyashankher Ramamirtham, Karnataka (IN); Srinivasan H Sengamedu, Karnataka (IN); Sandeepkumar Bhuramal Satpal, Karnataka (IN)

(73) Assignee: Yahoo! Inc., Sunnyvale, CA (US)

( * ) Notice: Subject to any disclaimer, the term of this patent is extended or adjusted under 35 U.S.C. 154(b) by 383 days.

(21) Appl. No.: 12/652,624

(22) Filed: Jan. 5, 2010

(65) Prior Publication Data

US 2011/0167063 A1    Jul. 7, 2011

(51) Int. Cl.
*G06F 7/00* (2006.01)
*G06F 17/30* (2006.01)

(52) U.S. Cl.
CPC ............................... *G06F 17/30854* (2013.01)
USPC .......................................... 707/737; 707/748

(58) Field of Classification Search
USPC ......... 707/706, 737, 769, 709, 741, 748, 749, 707/768, 802
See application file for complete search history.

(56) References Cited

U.S. PATENT DOCUMENTS

| | | | |
|---|---|---|---|
| 6,678,681 B1 | 1/2004 | Brin | |
| 6,701,350 B1 | 3/2004 | Mitchell | |
| 6,892,237 B1 | 5/2005 | Gai et al. | |
| 6,917,972 B1 | 7/2005 | Basko et al. | |
| 6,950,809 B2 | 9/2005 | Dahan et al. | |
| 7,072,883 B2 | 7/2006 | Potok et al. | |
| 7,107,338 B1 | 9/2006 | Nareddy et al. | |
| 7,117,193 B1 | 10/2006 | Basko et al. | |
| 7,143,365 B2 | 11/2006 | Gallella | |
| 7,315,858 B2 | 1/2008 | Potok et al. | |
| 7,395,332 B2 | 7/2008 | Gai et al. | |
| 7,590,707 B2 * | 9/2009 | McCloy et al. | 709/217 |
| 7,707,229 B2 * | 4/2010 | Tiyyagura | 707/802 |
| 8,060,601 B1 * | 11/2011 | Brown et al. | 709/224 |
| 2008/0114800 A1 * | 5/2008 | Gazen et al. | 707/101 |
| 2008/0133540 A1 * | 6/2008 | Hubbard et al. | 707/10 |
| 2009/0089278 A1 * | 4/2009 | Poola et al. | 707/5 |
| 2011/0119208 A1 * | 5/2011 | Kirshenbaum et al. | 706/12 |

* cited by examiner

*Primary Examiner* — Md. I Uddin
(74) *Attorney, Agent, or Firm* — Hickman Palermo Truong Becker Bingham Wong LLP

(57) ABSTRACT

Web pages are efficiently categorized in a data processor without analyzing the content of the web pages. According to at least one embodiment, data is maintained that represents sample URLs grouped into a plurality of clusters. The sample URLs of a cluster are used to produce a URL regular expression pattern ("URL-regex") that differentiates the sample URLs of the cluster from the sample URLs of other clusters and that covers at least a specified percentage of the sample URLs in the cluster. The process of producing a URL-regex is repeated for each of the clusters producing a URL-regex for each cluster. Web pages are then categorized into one of the clusters by determining which of the URL-regex patterns produced for the clusters match URLs that refer to the web pages. Thus, a web page may be categorized based on a URL that refers to the web page without having to obtain and analyze the content of the web page.

24 Claims, 8 Drawing Sheets

TECHNIQUES FOR CATEGORIZING WEB PAGES

CROSS-REFERENCE TO RELATED APPLICATIONS

This application is related to U.S. patent application Ser. No. 11/935,622 filed on Nov. 6, 2007 entitled TECHNIQUES FOR TOKENIZING URLS.

TECHNICAL FIELD

The present invention relates to techniques in a data processor for categorizing web pages according to regular expression patterns produced from Uniform Resource Locators.

BACKGROUND

Computers are useful for storing and providing access to large amounts of information. The explosive growth of the Internet has provided access to a tremendous amount of information from an extremely wide variety of sources. The Internet comprises computers and data networks interconnected through data communication links. The World Wide Web ("Web") portion of the Internet allows a server computer to send graphical web pages to a remote client computer. The remote client computer typically displays received web pages using a browser application (e.g., Mozilla Firefox or Microsoft Internet Explorer). To request a web page, a client computer specifies a Uniform Resource Locator (URL) of the web page in a request (e.g., a Hyper-Text Transfer Protocol ("HTTP") request). The request is forwarded and received by a web server capable of furnishing the requested web page. When that web server receives the request, it sends the specified web page to the client computer.

The Web comprises millions of "web sites" with each site having a number of web pages. Each web site comprises one or more server computers for responding to requests from client computers for web pages. Some web sites provide web pages or web page content to client computers based on the web pages of other web sites. For example, a search engine is a type of web site that indexes information available on the Web. Typically, a search engine web site operates by returning, in response to receiving a search query from a client computer, a search result web page that lists links to the web pages of other web sites that best match the query.

As another example of a web site that provides content based on a web page of another web site, an advertising web site may provide one or more advertisements to be displayed on a web page that is served by another web site. For example, the other web site may serve a web page to a client computer containing code which, when executed by a browser application on the client computer, causes the browser application to send a request to the advertising web site. The request may specify the URL of the web page served by the other web site. In response to receiving the request, the advertising web site may return advertising content to be displayed by the browser application in conjunction with display of the web page from the other web site.

A web site may take one or more actions based on the web pages of other web sites. For example, a search engine web site, when creating an index of web pages accessible on the Web, may extract attributes (e.g., text, graphics, or images) from the web pages of other web sites so that the extracted attributes can be displayed in search result web pages. The web site may extract relevant attributes from web pages based on, for example, the application of a set of content extraction rules to the content of the web pages. However, in many cases, because of the diversity of web page content and layout, it is difficult to compose a set of content extraction rules that extract the appropriate information from all web pages. Further, the Web comprises many millions of web pages. More and more web pages become accessible on the Web every day. Thus, applying all content extraction rules to all web pages may not be practical.

In addition to or instead of applying content extraction rules to the web pages of other web sites, a web site may provide content to be displayed on a specified web page served by another web site. As an example, an advertising web site may need to determine which of many possible advertisements to display on a web page of another web site. According to one possible solution, an advertising web site, in response to receiving a request specifying the URL of the web page on which advertisements are to be displayed, could retrieve the web page from the other web site and apply one or more content extraction rules to determine which of the many possible advertisements should be displayed on the web page. However, this solution is time consuming as it requires the advertising web site to connect over a network to the other web site, retrieve the web page from the other web site, and apply the content extraction rules to the web page. The amount of time needed to do this may be too great in the context of responding to a request for advertising content. Further, in the context of many concurrent requests for advertising content, this solution may be too resource intensive on the advertising web site. Further, as mentioned above, all content extraction rules may not be applicable to all web pages.

What is needed then is a solution that enables a web site to efficiently determine which subset of a set of actions applies to a specified web page. Specifically, the solution should enable a web site to make this determination without having to analyze the content of the web page. The present invention provides a solution for theses and other needs.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

1.0 Introduction

Figure 1:
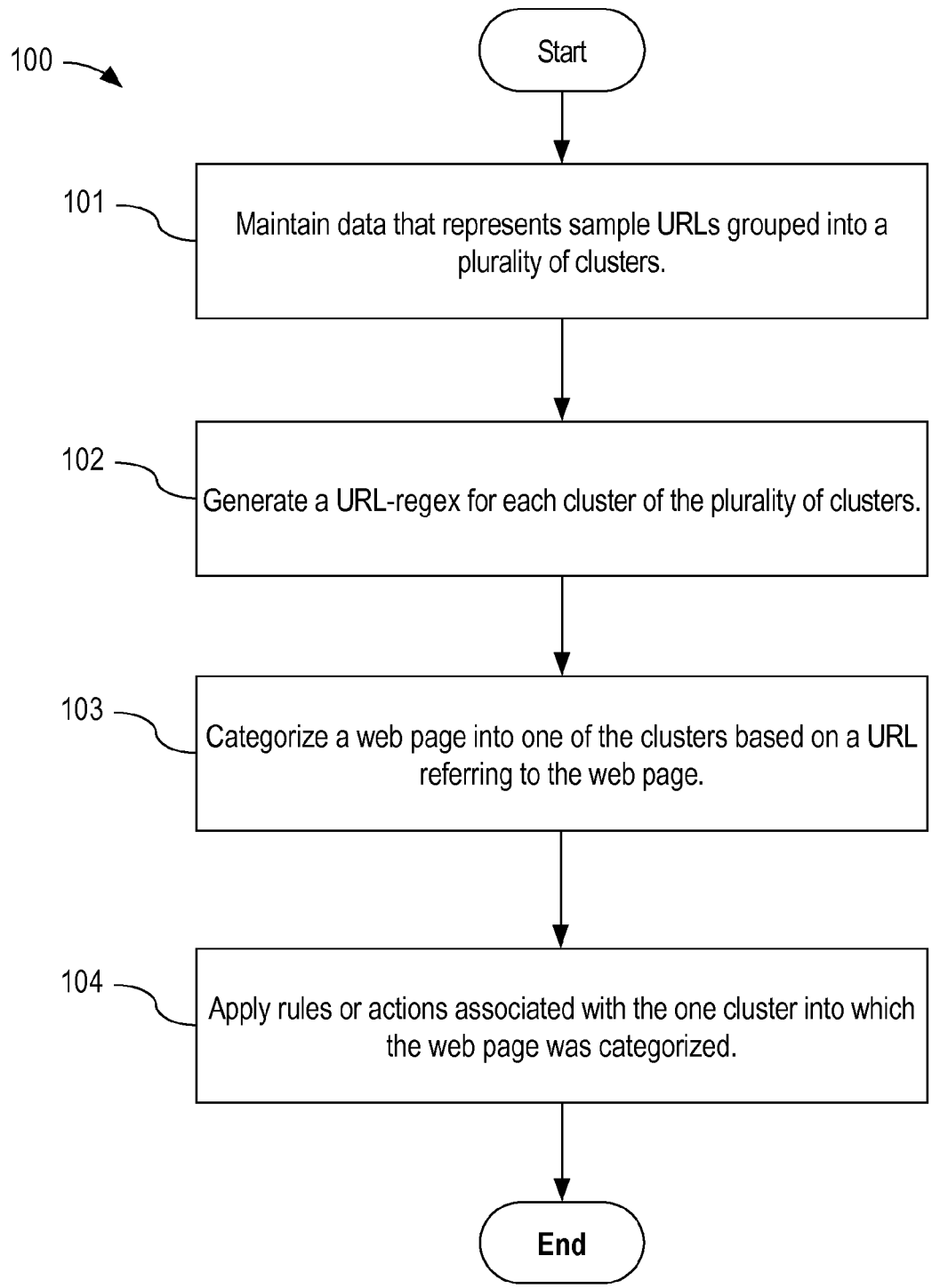
FIG. 1 is a flowchart for categorizing web pages.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

2.0 General Overview

Embodiments of the present invention comprise systems and methods to facilitate the categorization of web pages in real-time. The embodiments solve several problems faced by web sites that provide web pages or web page content based on web pages of other web sites, such as how to efficiently determine which of many possible actions apply to a specified web page.

Embodiments of the present invention enable a web site to not only categorize a web page but to do so without having to analyze the content of the web page. A web site may employ embodiments of the invention to efficiently categorize a specified web page. Further, a web site may employ embodiments of the invention to quickly determine, based on the categorization, which of many possible actions apply to the categorized web page. For example, a search engine web site may employ embodiments of the invention when indexing web pages on the Web to determine which of many possible content extraction rules apply to a particular indexed web page. As another example, an advertising web site may employ embodiments of the invention to determine which of many possible advertisements to display on a specified web page.

While embodiments of the present invention are explained by examples involving a search engine web site and an advertising web site, it should be understood that embodiments of the invention may be employed in any computer system having a need to categorize web pages.

In embodiments of the invention, web pages are categorized based on Uniform Resource Locators (URLs) that refer to the web pages. Thus, the content of a web page need not be parsed or otherwise analyzed in order for the web page to be categorized.

According to at least one embodiment, data is maintained that represents sample URLs grouped into a plurality of clusters. The sample URLs of a cluster are used to produce a URL regular expression pattern ("URL-regex") that differentiates the sample URLs of the cluster from the sample URLs of other clusters and that covers at least a specified percentage of the sample URLs in the cluster. The process of producing a URL-regex is repeated for each of the clusters producing a URL-regex for each cluster. Web pages are then categorized into one of the clusters by determining which of the URL-regex patterns produced for the clusters match URLs that refer to the web pages. Thus, a web page may be categorized based on a URL that refers to the web page without having to obtain and analyze the content of the web page.

According to at least one embodiment, content extraction rules or other actions are associated with clusters. The rules and actions associated with a cluster are applied in response to matching a URL referring to a web page to the URL-regex for the cluster. In this way, the subset of all possible actions and content extraction rules that apply to a web page can be determined without having to apply all possible rules to the web page and without having to obtain and analyze the content of the web page.

Embodiments of the invention include techniques for identifying discriminative and selective URL components from the sample URLs of a cluster so that the likelihood that a given URL will match more than one URL-regex is reduced. Further, in one or more embodiments of the invention, URL-regex patterns are optimized so that time spent matching a new URL to a URL-regex is minimized.

Embodiments of the invention include tunable parameters that affect the coverage of a produced URL-regex based on application requirements or needs. Further, embodiments of the invention include tunable parameters that affect the complexity of produced URL-regex patterns based on application requirements or needs.

3.0 A Process for Categorizing Web Pages

FIG. 1 illustrates a high-level process 100 for categorizing web pages according to one or more embodiments of the invention. Process 100 and the other processes described herein are primarily described with reference to flowcharts. Each block within the flowcharts represents both a method step and element of an apparatus for performing the method step. Depending upon the implementation, the corresponding apparatus element may be configured in hardware, software, firmware, or combinations thereof. The operations described with reference to each block of each flowchart are, in one embodiment, performed by processes or threads executing on computer system 700, which is discussed below with reference to FIG. 7.

As shown in FIG. 1, process 100 begins at step 101 in which data is maintained that represents sample URLs grouped into a plurality of clusters. The sample URLs and the grouping of sample URLs into clusters serve as sample data for generating a representative URL-regex for each cluster of the plurality of clusters in step 102 of process 100.

3.1 Clusters

Very generally, a cluster comprises a grouping of sample URLs based on some similarity between the sample URLs or some similarity between the web pages referred to by the sample URLs. Sample URLs may be grouped into clusters using any suitable method for grouping URLs. Embodiments of the invention are not limited to any particular method. Further, the sample URLs grouped into clusters may be sampled from virtually any number of web sites. For example, the set of sample URLs may comprise URLs referring to web pages indexed by a search engine web site.

According to one embodiment, data is maintained that represents sample URLs grouped into web site-specific clusters. In a web site-specific clustering approach, all the sample URLs of a cluster refer to the same web site. However, there may be more than one cluster for a web site. For example, for a shopping web site, there may be a cluster of sample URLs for the catalog portion of the web site and another cluster of sample URLs for the product reviews portion of the shopping web site.

Grouping sample URLs into web site-specific clusters is one effective way to increase the probability that a URL-regex pattern produced for a cluster will be selective. A selective URL-regex is one that minimizes matches to URLs that "belong" to other clusters. A URL-regex produced for a web site-specific cluster is more likely to be selective because the URL structure of a web site is typically designed by the developer of the web site and therefore varies from web site to web site and between portions of a web site. For example, one web site developer might use the term "product" in URLs that refer to product pages of his web site while another web site developer might use the term "dp" in URLs that refer to product pages of her web site. As another example, a web site developer may use the term "product" in URLs that refer to product pages of her web site and use the term "reviews" in URLs that refer to product review pages of the web site.

Grouping sample URLs into web site specific clusters is just one example of how sample URLs might be clustered. Embodiments of the invention are not limited to any particular method or manner of grouping sample URLs into clusters. Methods other than the web site specific approach described herein may be used. For example, sample URLs may be grouped into clusters based on topic. More specifically, sample URLs referring to web pages about autos may be grouped into one cluster while sample URLs referring to web pages about sports could be grouped into another cluster.

Data representing a grouping of sample URLs into clusters may be maintained by one or more computing devices using any suitable means for maintaining such data. For example, the data may be stored in a database or in one or more files of a computer-based filesystem.

3.2 URL-Regex Patterns

As shown in FIG. 1, at step 102 of process 100, once sample URLs have been grouped into a plurality of clusters, a URL-regex is generated for each cluster of the plurality of clusters.

A URL-regex is a regular expression pattern associated with a cluster that defines a set of URLs that belong to the cluster. A given URL may be evaluated against the URL-regex to determine whether the given URL belongs to the cluster. The following is an example of a URL-regex expressed using Perl regular expression syntax:

https?://www\.example\.com/(.*?)(detail\.html|dp/)

While the example URL-regex patterns provided herein are expressed using Perl regular expression syntax, embodiments of the invention are not limited to any particular syntax and other regular expression syntaxes may be used such as, for example, POSIX regular expression syntax.

3.3 Approaches for Generating URL-Regex Patterns

Various approaches are described herein for generating a URL-regex from sample URLs. In general, these approaches attempt to produce a URL-regex that is discriminative, selective, and simple. A discriminative URL-regex is one that contains an optimal set of patterns for identifying URLs that belong to a cluster. Generally, the optimal set of patterns is the simplest regular expression pattern needed to distinguish URLs that belong to one cluster from URLs that belong to other clusters. As mentioned previously, a selective URL-regex is one that minimizes matches to URLs that belong to other clusters. A simple URL-regex is one for which evaluation of the URL-regex against a candidate URL is efficient in terms of the number of computer processing cycles required to complete the evaluation.

To aid in understanding the details of the various approaches described below some background on the general structure of URLs will now be provided.

In general, a URL comprises one or more URL components. Broadly, a URL component is any sequence of one or more contiguous characters that make up the URL. The general structure of a URL may be described as a protocol component, followed by a colon and two forward slashes, followed by a hostname component, which is followed by a pathname component, and which is optionally followed by a query string component. For example, in the following URL "http" is a protocol component, "www.example.com" is a hostname component, "/path/to/file" is a pathname component, and "attr1=val1&attr2=val2&attr3=val3" is a query string component (the '?' character after the pathname is used to indicate the end of the pathname and the start of the query string):

http://www.example.com/path/to/file?attr1=val1&attr2=val2&attr3=val3

URL components of a pathname component in a URL may be separated by a backslash '/'. Thus, in the above-example URL, "path", "to", and "file" may be considered separate pathname components.

The query string comprises one or more attribute-value pair components separated by the '&' character. Thus, in the above-example URL, there are three attribute-value pairs: attr1=val1, attr2=val2, and attr3=val3. In an attribute-value pair component, the string to the left of the equals character ('=') is considered the attribute component and the string to the right of the equals character ('=') is considered the value component.

With this background, various approaches for generating URL-regex patterns will now be described.

3.3.1 An Approach for a Generating URL-Regex Pattern for a Cluster

Figure 2:
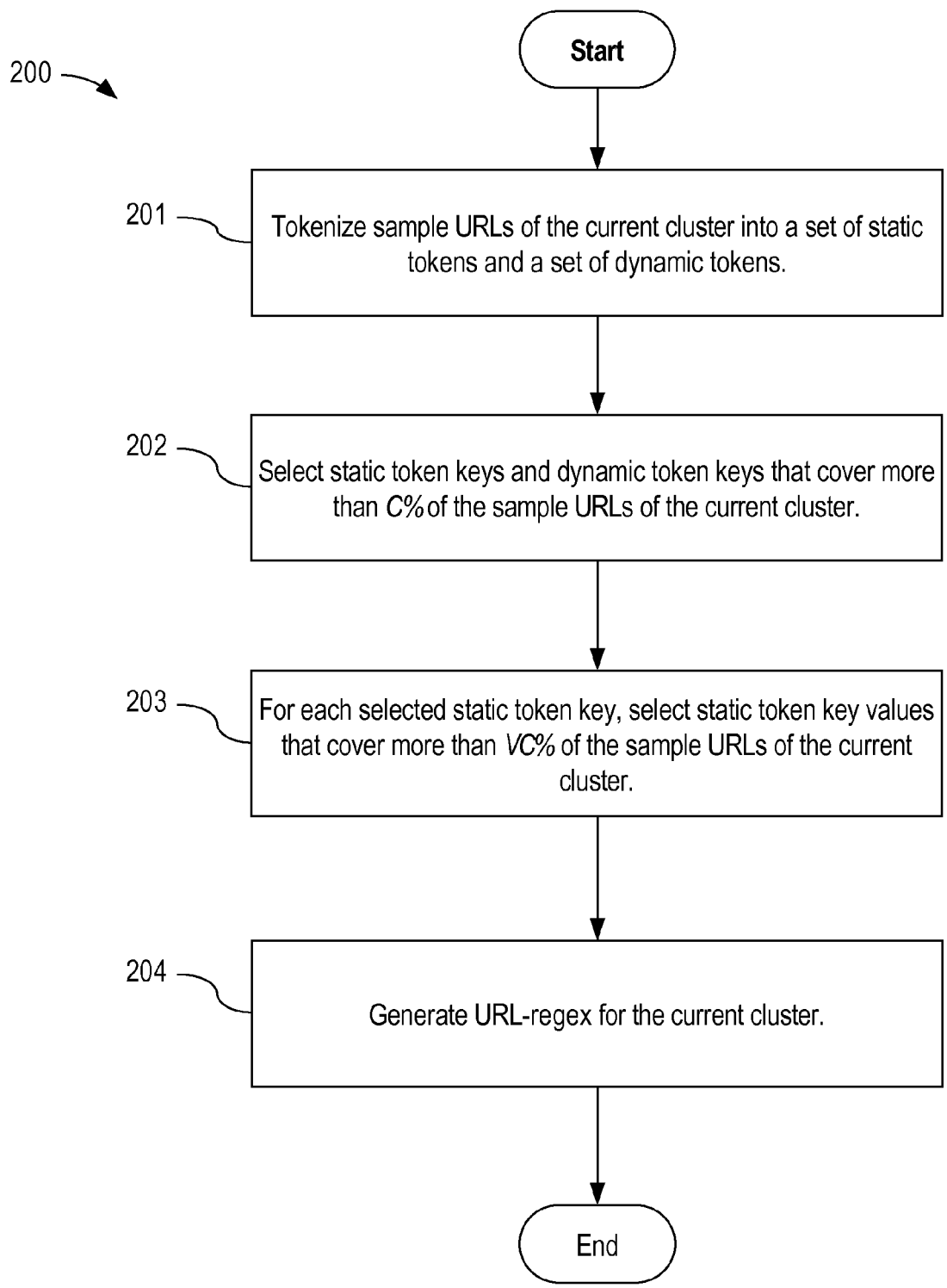
FIG. 2 is a flowchart of an approach for generating a URL-regex pattern for a cluster.

FIG. 2 illustrates an approach 200 for generating a URL-regex pattern for a cluster according to one or more embodiments of the invention. Approach 200 may be performed for each cluster of a plurality of clusters to generate a URL-regex pattern for each cluster.

As shown in FIG. 2, at step 201, each sample URL of the cluster is tokenized. According to one embodiment, each sample URL of the cluster is processed to produce three sets of tokens: a hostname token, a set of static tokens, and a set of dynamic tokens. The hostname token is produced by processing the hostname portion of the sample URL. The set of static tokens is produced by processing the pathname portion of the sample URL. The set of dynamic token is produced by processing the query string portion of the sample URL. In the case where the sample URL does not comprise a pathname, the set of static tokens may be an empty set. In the case where the sample URL does not comprise a query string, the set of dynamic tokens may be an empty set.

In one embodiment, the hostname token is produced by parsing the hostname portion of the sample URL. For example, according to the embodiment, the hostname token for the sample URL "http://www.example.com/gp/product/images/B00213JM90?ie=UTF&img=2" is "www.example.com".

In an alternative embodiment, only a portion of the hostname portion is used as the hostname token. For example, in one embodiment, the hostname portion is parsed for the top-level domain and the first sub-domain. For example, according to this embodiment, the hostname token for sample URL "http://www.example.com/gp/product/images/B00213JM90?ie=UTF&img=2" is "example.com".

In one embodiment, the set of static tokens is produced by parsing the pathname portion of the sample URL into pathname components. The set of static tokens comprises a set of key-value pairs, one key-value pair for each pathname component in the pathname portion of the sample URL. The key of a static token key-value pair ("static token key") indicates the position of the corresponding pathname component in the pathname. The value of a static token key-value pair ("static token value") is the pathname component itself. For example, in one embodiment, the following set of static tokens may be produced for the sample URL "http://www.example.com/gp/product/images/B00213JM90?ie=UTF&img=2":

| | |
|---|---|
| key="pos1" | value="gp/" |
| key="pos2" | value="product/" |
| key="pos3" | value="images/" |
| key="pos4" | value=" B00213JM90" |

As shown by this example, the static token value may be a text string representation of a URL component of the sample URL. The static token key may indicate the position of the corresponding URL component in the pathname of the sample URL. As an example, in the example set of static tokens above, the static token key is a text string that takes the form of "pos[X]", where X is a numeric value indicating the position of the corresponding URL component in the pathname portion of the sample URL. However, embodiments of the invention may use any suitable text string representation that indicates the position of the corresponding URL component in the pathname of the sample URL. Embodiments are not limited to the text string representations of the examples provided herein. For example, a static token key may have a general text string format of "folder[X]" or simply "[X]" where X is a numeric value indicating the position of the corresponding URL component in the pathname.

In some cases, it may be beneficial to further tokenize the pathname portion of a sample URL to capture deeper patterns in the pathname portion. For example, in the sample URL "http://www.example.com/LocationPhotos-g298555-w2-Guangzhou_Guandong.html" it may be useful to identify the URL components "Location" and "Photos", or other URL components in the pathname that are not separated by backslashes ('/'). Accordingly, in one embodiment, the pathname portion of a sample URL is tokenized using a "deep" tokenization procedure. Example systems and methods for performing deep tokenization are described in related U.S. patent application Ser. No. 11/935,622 entitled TECHNIQUES FOR TOKENIZING URLS, the entire contents of which is hereby incorporated by reference as if fully set forth herein.

In one embodiment, "deep" tokens—tokens identified using a deep tokenization procedure such as the one referred to above—are included in a set of static tokens. The set of static tokens may include static token keys with position indicators to indicate the position of the deep tokens within the pathname portion of the sample URL. For example, according to the embodiment, a set of static tokens for the sample URL "http://www.example.com/LocationPhotos-g298555-w2-Guangzhou_Guandong.html" may include the static token {key="pos1", value="Location"} and the static token {key="pos2", value="Photos"}.

As mentioned previously, in addition to producing a set of static tokens for a sample URL, a set of dynamic tokens may be produced from the query string portion of the sample URL. In one embodiment, a set of dynamic tokens comprises one or more key-value pairs. Each key-value pair in the set of dynamic tokens corresponds to an attribute-value pair component in the query string of the sample URL. The "dynamic token key" in the dynamic token key-value pair corresponds to the attribute component of the attribute-value pair. The "dynamic token value" in the dynamic token key-value pair corresponds to the value component of the attribute value pair. As an example of a set of dynamic tokens, consider the sample URL "http://www.example.com/gp/product/images/B00213JM90 ?ie=UTF&img=2". According to one embodiment, the following set of dynamic tokens may be produced from this sample URL:

| | |
|---|---|
| key="ie" | value="UTF" |
| key="img" | value="2" |

After tokenizing each sample URL of the cluster, the set of static tokens produced for each sample URL may be combined into a single set of static tokens comprising the union of all static tokens produced from the sample URLs of the cluster. Similarly, the set of dynamic tokens produced for each sample URL may be combined into a set of dynamic tokens comprising the union of all dynamic tokens produced from the sample URLs of the cluster. In one embodiment, duplicate static tokens and duplicate dynamic tokens are not included in the single set of static tokens and the single set of dynamic tokens.

The above described approaches for tokenizing a sample URL are but a few of many possible approaches for tokenizing a URL. Embodiments of the invention are not limited to only the approaches described herein and other approaches for identifying tokens in a URL may be used in conjunction with or instead of the approaches described herein.

At step 202 of process 200, once the sample URLs of the cluster have been tokenized, static token keys and dynamic token keys are selected from the sample URLs of the cluster that cover more than a specified percentage (C %) of the sample URLs of the cluster. In one embodiment, C % is a user-adjustable cluster coverage parameter that may be adjusted based on application requirements.

According to one embodiment, a static token key covers more than C % of the sample URLs of the cluster if more than C % of the sample URLs of the cluster include a URL component at the position indicated by the static token key in the pathname portion. For example, the static token key "pos1" covers all of the following sample URLs because all of the sample URLs include a URL component in the first position of the pathname portion:

http://www.example.com/catalog/101407608/Business_Suits.html
http://www.example.com/review/product/B00F1HGU6
http://www.example.com/gp/product/B00136RW24

Specifically, the first sample URL includes "catalog" in the first position, the second sample URL includes "review" in the first position, and the third sample URL includes "gp" in the first position.

According to one embodiment, a dynamic token key covers more than C % of the sample URLs of the cluster if more than C % of the sample URLs of the cluster include the attribute indicated by the dynamic token key in the query string portion. The order of the attribute within the query string of a sample URL is not relevant to the determination of whether a dynamic token key covers the sample URL. For example, the dynamic token key "messageID" covers all of the following sample URLs because all of the sample URLs include the attribute "messageID" in the query string portion:

http://www.example.com/reviews?messageID=124141
http://www.example.com/reviews?threadID=34&messageID=125543
http://www.example.com/reviews?messageID=134235&threadID=44

At step 203 of process 200, one or more static token values are selected for each of the static token keys selected in step 202. In one embodiment, the static token values that are selected for a selected static token key must cover more than a specified percentage (VC %) of the sample URLs of the cluster. In one embodiment, VC % is a user-adjustable value coverage parameter that may be adjusted based on application needs or requirements.

According to one embodiment, a static token value covers more than VC % of the sample URLs of a cluster if more than VC % of the sample URLs in the cluster include a URL component equal to the static token value at the position indicated by the corresponding static token key. For example, the static token value of the static token {key="pos1" value="review"} covers all the following sample URLs because all of the sample URLs include the URL component "review" in the first position of their respective pathnames:

> http://www.example.com/review/product/B0022HU4Y
> http://www.example.com/review/product/B00F1HGU6
> http://www.example.com/review/product/B00136RW24

Notably, for a given selected static token key, there may be more than one static token value that covers more than VC % of the sample URLs of the cluster.

At step 204 of process 200, a URL-regex comprising one or more regular expression patterns is generated for the cluster. In one embodiment, the produced URL-regex comprises a concatenation of a protocol regular expression pattern, a hostname regular expression pattern, a pathname regular expression pattern, and a query-string regular expression pattern.

In one embodiment, a protocol pattern is produced that matches both a URL referring to the HyperText Transfer Protocol ("http") and the HyperText Transfer Protocol Secure ("https"). For example, the protocol regular expression pattern "https?:" matches both "http:" and "https:". The '?' character is Perl regular expression syntax to indicate that the preceding pattern (e.g., the character 's') will be matched zero or one times. Embodiment of the invention are not limited to producing protocol patterns that match only "http" or "https". In other embodiments, a protocol pattern is produced that matches other protocols used in a URL such as, for example, the file transfer protocol ("ftp"), the lightweight directory access protocol ("ldap"), and the simple mail transfer protocol ("smtp").

In one embodiment, a hostname pattern is produced that comprises the hostname token identified in step 201. The hostname pattern and other regular expression patterns that comprise a URL-regex may include escaping to distinguish a literal character from a regular expression meta-character. For example, the '.' character is a Perl regular expression meta-character that if not escaped in a regular expression will match any character except the newline character, not just the '.' character. In one embodiment, regular expression meta-characters are escaped using a single backslash character ('\'). Accordingly, in one embodiment, the hostname token "www.example.com" is produced as the regular expression pattern "www\.example\.com".

In one embodiment, a pathname regular expression pattern is produced by concatenating the static token values selected in step 203 with the regular expression alternative operator (e.g., the vertical bar character '|') in the order the static token values appear in the sample URLs of the cluster. The order may be determined based on the pathname position information in the corresponding static token keys.

In one embodiment, if the number of static token values selected in step 203 for a particular static token key exceeds more than a specified number of values (MaxV), then a generic regular expression pattern is substituted in the pathname regular expression for the selected static token values. In one embodiment, the generic regular expression pattern is "(.*)" which greedily matches zero or more characters. In another embodiment, a non-greedy generic regular expression pattern such as, for example, "(.*?)" is substituted for static token key values. In one embodiment, MaxV is a user-adjustable value count parameter that may be adjusted based on application requirements.

In one embodiment, a query string regular expression pattern is produced by concatenating dynamic token keys selected in step 202 with the regular expression alternative operator (e.g., '|') to form a dynamic token key regular expression pattern group. This dynamic token key regular expression pattern group is repeated in the query string regular expression pattern a number of times equal to the number of dynamic token keys in the dynamic token key regular expression pattern group to account for the fact that attribute-value pairs may appear in any order in a query string. The instances of the dynamic token key regular expression pattern group in the query string regular expression pattern are separated from one another in the query string regular expression pattern with a generic regular expression pattern, for example, "(.*)" or "(.*?)".

In one embodiment, the number of dynamic token keys selected for inclusion in the dynamic token key regular expression pattern group does not exceed a specified maximum number of dynamic token keys (MaxD). If the number of dynamic token keys selected in step 202 would exceed MaxD, then up to MaxD dynamic token keys are selected that provide the highest cluster coverage as determined in step 202.

To illustrate process 200 by example, the following cluster of sample URLs may be considered:

> 1: http://www.example.com/Neutrogena-Fresh-Sunless-Lotion-Medium/dp/B0013OMJQK
> 2: http://www.example.com/Amazing-Adventures-Zooms-Academy-Capture/dp/0345483561
> 3: http://www.example.com/MoMa-Perpetual-Calendar-Gray-Silver/dp/B0013TPJ1C
> 4: http://www.example.com/Cohomology-Complete-Riemannian-Manifolds-Mathematical/dp/0821825593
> 5: http://www.example.com/ACCESS-HEALTH-INC-International-Competitive/dp/0597001227
> 6: http://www.example.com/gp/detail.html/ref=sc__iw__r__1__0/?asin=B000U0ISWM
> 7: http://www.example.com/gp/detail.html/602-9317026-9007025?asin=B000068ZID&AFID=Gifts.com&LNM=B000068ZID|EcoSphere__5.25
> 8: http://www.example.com/gp/detail.html?ie=UTF8&node=370693011&frombrowse=1&pricerange=2500-4999&rank=pmrank&asin=B001A3O1YC&rh=&page=1
> 9: http://www.example.com/gp/detail.html/sr=8-4/qid=1139218246/ref=sr__8__4/602-9126255-9547050?%5Fencoding=UTF8&asin=B000E5N0DA
> 10: http://www.example.com/gp/detail.html/sr=/qid=/ref=br__1__br__1__2/602-4782292-1799061?ie=UTF8&node=188112011&frombrowse=1&asin=B000BGZ0JY&rh=&page=1

According to one embodiment, process 200 produces the following URL-regex for this cluster of sample URLs:

https?://www\.example\.com/(.*?)(detail\.html|dp/)

As another example, the following cluster of sample URLs may be considered:

---

1: http://www.example.com/results.htm?KW=Personal+Loans&LO=City+of+Tulsa%
2C+OK&R=&SD=&PARMAPI=SRC%3Dswitchboard2%26sessionId%3D09F30ABF17D0A81
279C36132F2693011%26C%3DPersonal%2BLoans%26PS%3D10%26STYPE%3DS%26L%3
DTulsa%2BOK%26XSL%3Doff%26paging%3D1%26PBL%3Dtrue%26PI%3D20

2: http://www.example.com/results.htm?KW=Attorneys&LO=Denver%2C+CO&SD=
&R=A&PB=K&PARMAPI=SRC%3Dswitchboard2%26sessionId%3D5110E0058F260CEAB7
4B7BDB37305F59%26C%3DAttorneys%26PS%3D10%26STYPE%3DS%26L%3DDenver%2
BCO%26XSL%3Doff%26paging%3D1%26PBL%3Dtrue%26R%3DA%26PI%3D4269%26PB
%3DK 3: http://www.example.com/results.htm?KW=Printers&LO=City+of+Sacramento%
2C+CA&R=&SD=&PARMAPI=SRC%3Dswitchboard2%26sessionId%3DE0E9837CF907CBB
5B9F8FAFEDB9B1D08%26N%3DPrinters%26PS%3D10%26STYPE%3DS%26L%3DSacram
ento%2BCA%26XSL%3Doff%26paging%3D1%26PBL%3Dtrue%26PI%3D100&TYPE=busna
me 4: http://www.example.com/results.htm?KW=Massage+Therapists&LO=Minneapolis
%2C+MN&R=&SD=&PARMAPI=SRC%3Dswitchboard2%26sessionId%3D56F5CDE80EB6
AF13316D7CC92D687809%26C%3DMassage%2BTherapists%26PS%3D10%26STYPE%3DS
%26L%3DMinneapolis%2BMN%26XSL%3Doff%26paging%3D1%26PBL%3Dtrue%26PI%3
D10

5: http://www.example.com/results.htm?KW=Banks&LO=Washington%2C+DC&SD=
&R=A&PB=Y&PARMAPI=SRC%3Dswitchboard2%26sessionId%3DF6C68E6F4DD3B2894D
910B68A71272A3%26C%3DBanks%26PS%3D10%26STYPE%3DS%26L%3DWashington%2
BDC%26XSL%3Doff%26paging%3D1%26PBL%3Dtrue%26R%3DA%26PI%3D2549%26PB
%3DY 6: http://www.example.com/results.htm?KW=Insurance&LO=Indianapolis%2C+IN&R=
&SD=&PARMAPI=SRC%3Dswitchboard2%26sessionId%3DAF0AACC20287A99C34504966
07758240%26N%3DInsurance%26PS%3D10%26STYPE%3DS%26L%3DIndianapolis%2BIN
%26XSL%3Doff%26paging%3D1%26PBL%3Dtrue%26PI%3D30&TYPE=busname 7: http://www.example.com/results.htm?KW=Title+Company&LO=Albuquerque%2C+
NM&R=&SD=&PARMAPI=SRC%3Dswitchboard2%26sessionId%3D67BFF25AB5DB6FD49
C10E5312E4C387E%26C%3DTitle%2BCompany%26PS%3D10%26STYPE%3DS%26L%3D
Albuquerque%2BNM%26XSL%3Doff%26paging%3D1%26PBL%3Dtrue%26PI%3D80

8: http://www.example.com/results.htm?KW=Insurance&LO=Birmingham%2C+AL&
R=&SD=&PARMAPI=SRC%3Dswitchboard2%26sessionId%3D625FBBEF5FDB71B70EDEE
78A3B8217EB%26N%3DInsurance%26PS%3D10%26STYPE%3DS%26L%3DBirmingham%
2BAL%26XSL%3Doff%26paging%3D1%26PBL%3Dtrue%26PI%3D10&TYPE=busname 9: http://www.example.com/results.htm?KW=Insurance&LO=Las+Vegas%2C+NV&
R=&SD=&PARMAPI=SRC%3Dswitchboard2%26sessionId%3D80E3C52FB320514DC412928
2A2F34BB0%26N%3DInsurance%26PS%3D10%26STYPE%3DS%26L%3DLas%2BVegas%2
BNV%26XSL%3Doff%26paging%3D1%26PBL%3Dtrue%26PI%3D10&TYPE=busname 10: http://www.example.com/results.htm?KW=Hospitals&LO=City+of+Lancaster%2C+
PA&R=A&SD=&PARMAPI=SRC%3Dswitchboard2%26sessionId%3DB0320479DEEF3EA33
5266FDAD69F1F63%26C%3DHospitals%26PS%3D10%26STYPE%3DS%26L%3DLancaster
%2BPA%26XSL%3Doff%26R%3DA%26paging%3D1%26PBL%3Dtrue%26PI%3D30

---

According to one embodiment, process 200 produces the following URL-regex for this cluster of sample URLs:

--- https?://www\.example\.com/results\.htm(.*?)(KW=|LO=|PARMAPI=|R=|SD=)(.*?)
(KW=|LO=|PARMAPI=|R=|SD=)(.*?)(KW=|LO=|PARMAPI=|R=|SD=)
(.*?)(KW=|LO=|PARMAPI=|R=|SD=)(.*?)(KW=|LO=|PARMAPI=|R=|SD=)

---

3.3.2 An Approach for Generating a URL-Regex Pattern for a Cluster

Figure 3:
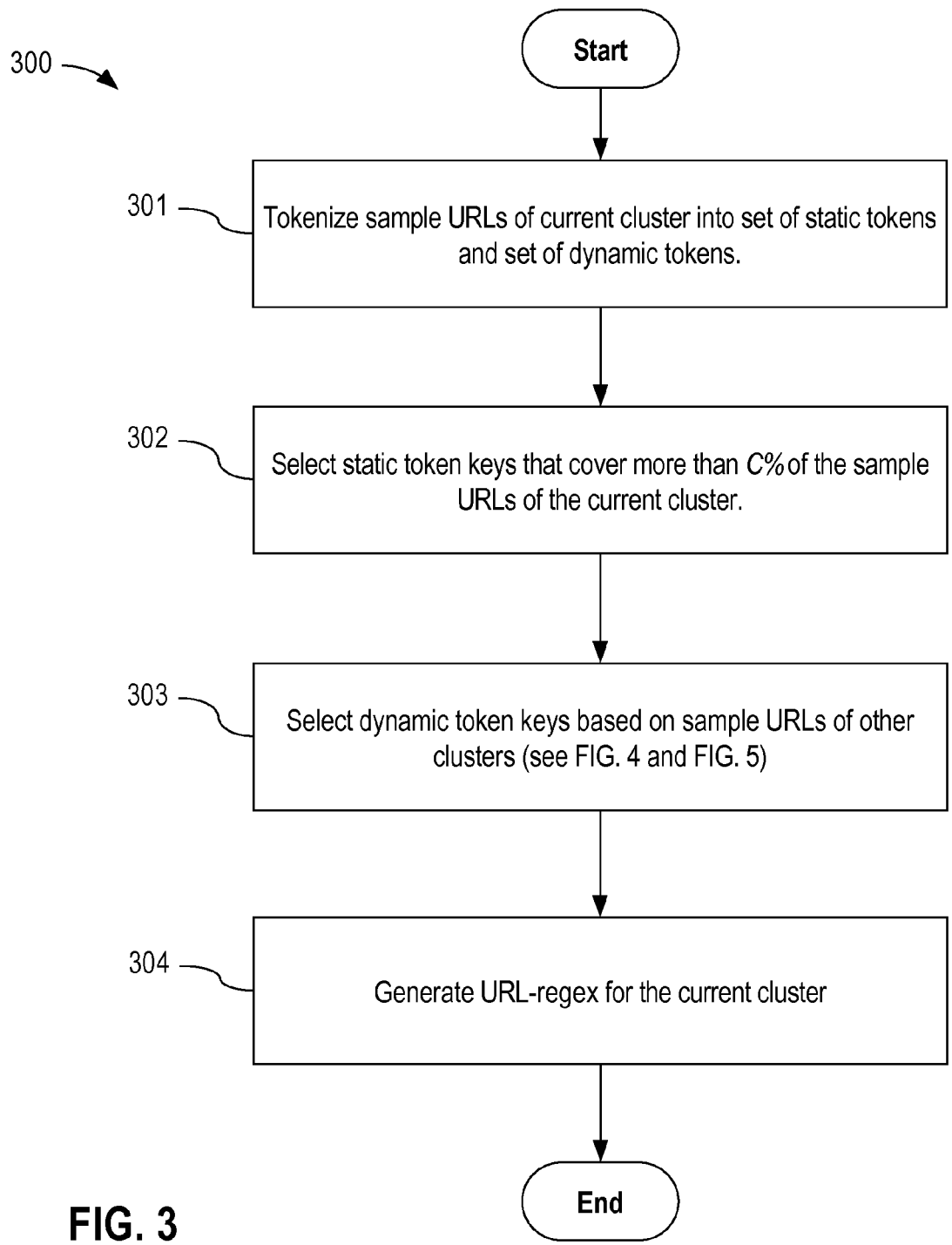
FIG. 3 is a flowchart of an approach for generating a URL-regex pattern for a cluster.

FIG. 3 illustrates an approach 300 for generating a URL-regex pattern for a cluster according to one or more embodiments of the invention. Approach 300 of FIG. 3 differs from approach 200 of FIG. 2 in that approach 300 generates a URL-regex pattern for a cluster based on not only the sample URLs of the cluster but also based on sample URLs of other clusters. By generating a URL-regex for a cluster based on sample URLs of other clusters, approach 300 can generate a URL-regex that is highly discriminative and highly selective. As with approach 200, approach 300 may be performed for each cluster of a plurality of clusters to generate a URL-regex pattern for the cluster.

Step 301 of process 300 generally corresponds to step 201 of process 200 in which each sample URL of the current cluster is tokenized. In one embodiment, each sample URL of the current cluster is tokenized into a hostname token, a set of static tokens, and a set of dynamic tokens. The static tokens are then combined into a single set of static tokens and dynamic tokens are then combined into a single set of dynamic tokens as described above with respect to step 201 of process 200.

Step 302 of process 300 generally corresponds to step 202 of process 200 except that only static token keys that cover C % of the sample URLs of the current cluster are selected. Selection of dynamic token keys occurs at step 303, which is described in greater detail below.

At step 303, a best set of dynamic token keys from the sample URLs of the current cluster are identified based on sample URLs of one or more other clusters of a plurality of clusters of which the current cluster is a member. In one or more embodiments, a best set of dynamic token keys is identified using entropy and information gain metrics as described in greater detail herein.

Two example approaches for identifying a best set of dynamic token keys based on sample URLs of one or more other clusters of a plurality of clusters will now be described with respect to FIG. 4 and FIG. 5. To aid in understanding the approaches of FIG. 4 and FIG. 5, the cluster for which a URL-regex is being generated is referred to as the "current cluster" to differentiate that cluster from the one or more other clusters upon which generation of the URL-regex for the current cluster is based.

3.3.2.1 An Approach for Identifying Discriminative URL Components

Figure 4:
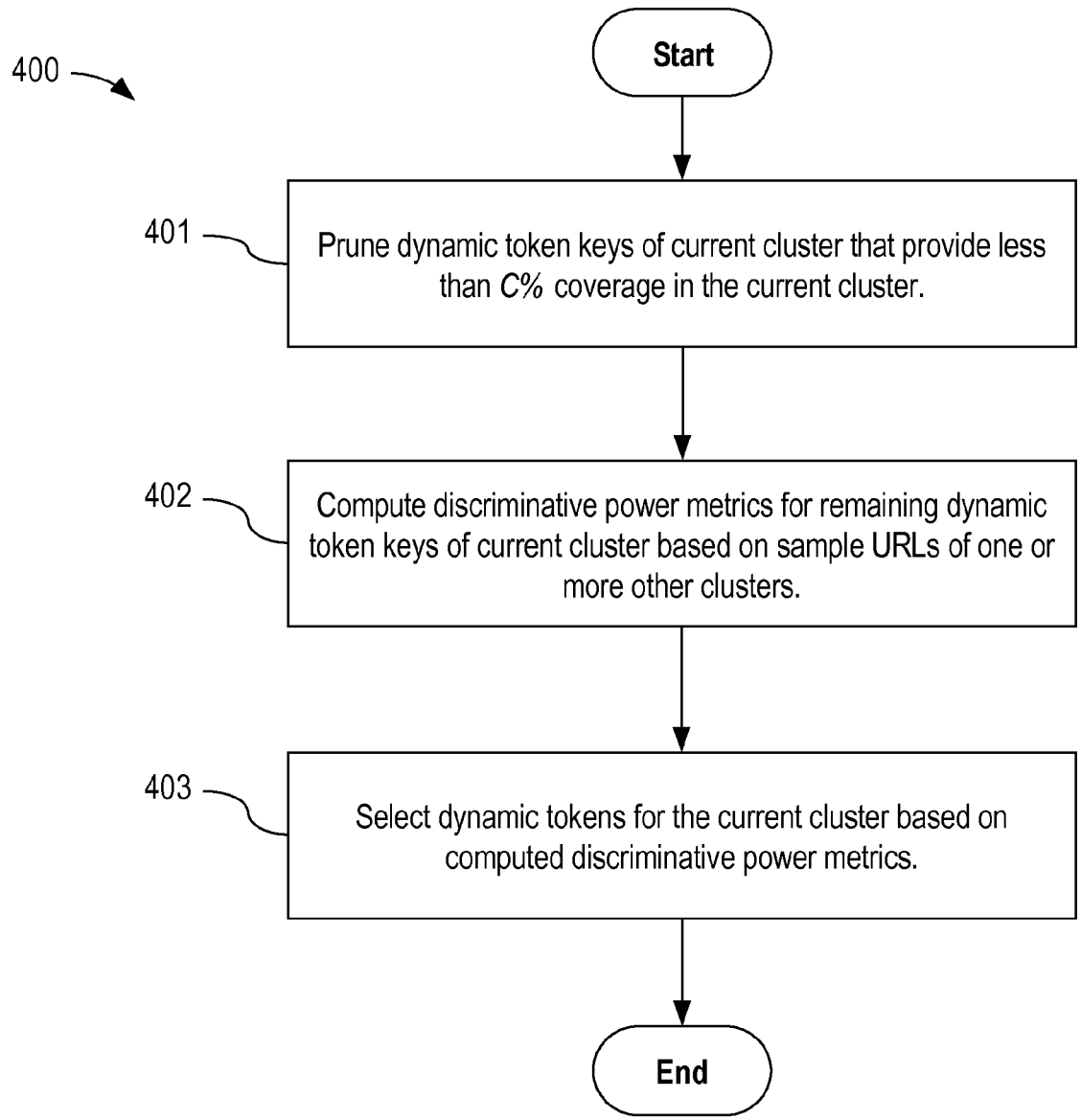
FIG. 4 is a flowchart of an approach for identifying a best set of discriminative URL components from sample URLs of a cluster.

FIG. 4 illustrates an approach 400 for identifying a best set of dynamic token keys from sample URLs of the current cluster based on sample URLs of one or more other clusters of a plurality of clusters.

At step 401, the set of dynamic tokens produced in step 301 of process 300 from the sample URLs of the current cluster is pruned so that the set comprises only those dynamic tokens having a dynamic token key that covers at least C % of the sample URLs of the current cluster.

At step 402, a discriminative power metric is calculated for the dynamic token keys from the sample URLs of the current cluster that remain after the pruning performed in step 401. A discriminative power metric is a measurement of the discriminative power of a given dynamic token key to discriminate between URLs that belong to one cluster from URLs that belong to other clusters. The discriminative power metric calculated for a dynamic token key of the current cluster is based on sample URLs of one or more other clusters of a plurality of clusters of which the current cluster is a member.

In one embodiment, the discriminative power metric for a given dynamic token key is calculated as the entropy of the dynamic token key. In one embodiment, the entropy of the dynamic token key is calculated as follows:

$$\text{Entropy(key)} = -\sum_{i=1}^{k} P_i \log_k P_i \qquad (1)$$

where:
$P_i$=The number of sample URLs in cluster i containing key/total number of sample URLs in all clusters containing key.
k=Total number of clusters in the plurality of clusters.

Using the entropy formula (1) above, the entropy of a dynamic token key lies in the range 0 to 1. The lower the entropy value (i.e., the lower the entropy), the more discriminative the dynamic token key.

In one embodiment, the discriminative power metric for a given dynamic token key is calculated as the information gain of the dynamic token key. In one embodiment, the information gain of the dynamic token key is calculated as follows:

$$\text{Information Gain(key)} = \qquad (2)$$
$$-\sum_{i=1}^{k} P(c_i) \log_k P(c_i) + P(\text{key}) \sum_{i=1}^{k} P(c_i \mid \text{key}) \log_k P(c_i \mid \text{key}) +$$
$$P(\text{key}') \sum_{i=1}^{k} P(c_i \mid \text{key}') \log_k P(c_i \mid \text{key}')$$

where:
k=Total number of clusters in the plurality of clusters.
$P(c_i)$=Total number of sample URLs in cluster $c_i$/total number of sample URLs in all clusters.
P(key)=Number of sample URLs in all clusters containing key/total number of sample URLs in all clusters.
$P(c_i|\text{key})$=Number of sample URLs in cluster $C_i$ containing key/total number of sample URLs in all clusters containing key.
P(key')=Number of sample URLs in all clusters not containing key/total number of sample URLs in all clusters.
$P(c_i|\text{key}')$=Number of sample URLs in cluster $C_i$ not containing key/total number of sample URLs in all clusters not containing key.

Using the information gain formula (2) above, the information gain of a dynamic token key lies in the range 0 to 1. However, unlike the entropy metric produced according to formula (1), the higher the information gain value for a dynamic token key, the more discriminative power the dynamic token key has.

At step 403 once discriminative power metrics have been calculated in step 402 for the dynamic token keys that remain after step 401, a best set of dynamic token keys is selected for the current cluster based on the calculated metrics. In one embodiment, dynamic token keys are selected from the remaining keys that have the most discriminative power according to the metrics calculated in step 402. In one embodiment, this comprises selecting dynamic token keys that have the lowest entropy or the highest information gain. In one embodiment, at most a specified number of dynamic token keys (MaxD) are selected with the most discriminative keys according to their discriminative power metrics being selected first. In one embodiment, in addition to or instead of selecting up to MaxD number of dynamic token keys based on discriminative power, only dynamic token keys that cover more than C % of the sample URLs of the current cluster are selected. In one embodiment, MaxD is a user-adjustable parameter that may be configured based on application needs or requirements.

At the end of process 400, a subset of the set of dynamic tokens produced in step 301 of process 300 has been selected based on the discriminative power of the dynamic token keys of those dynamic tokens.

3.3.2.2 An Approach for Identifying Discriminative URL Components

Figure 5:
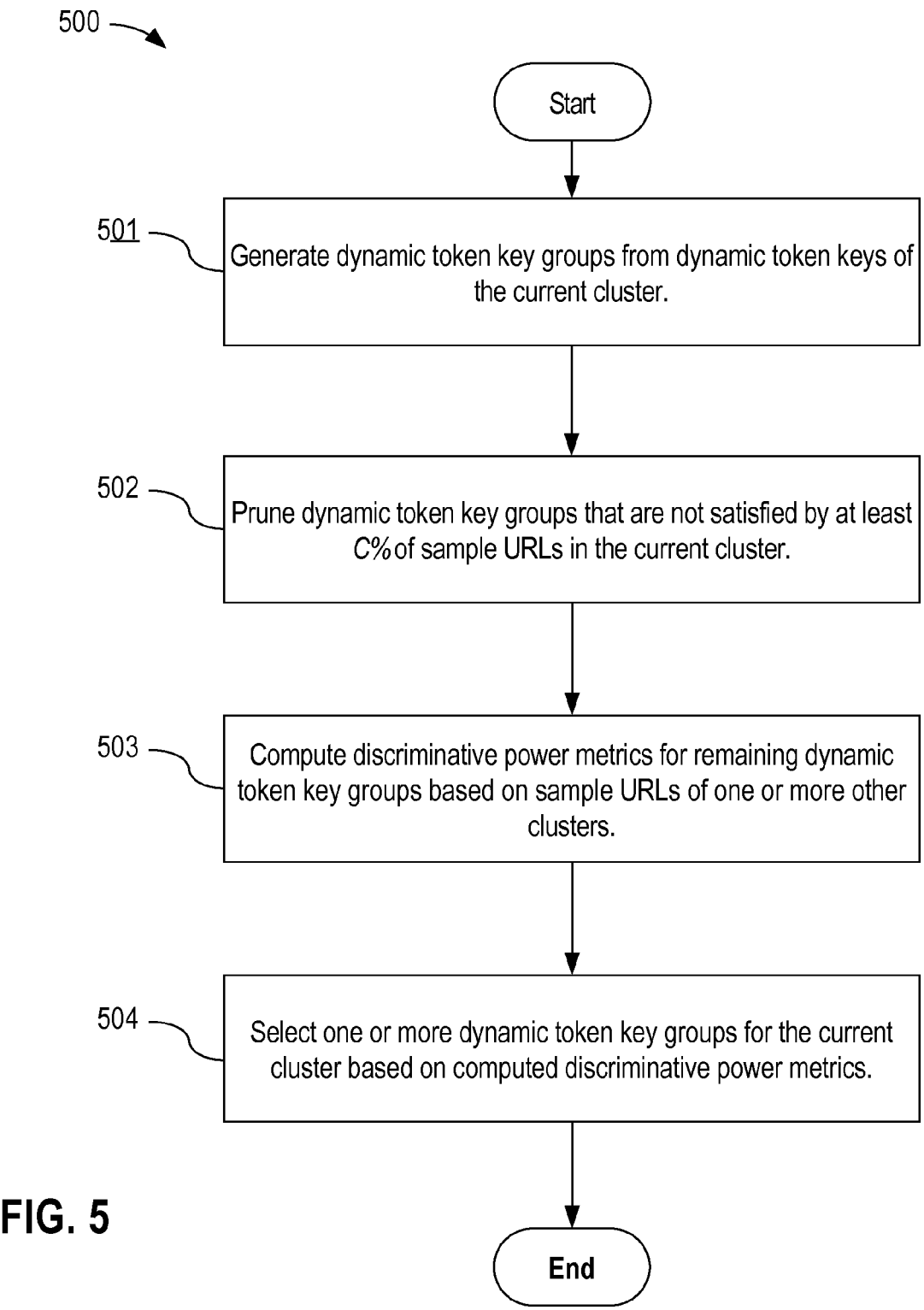
FIG. 5 is a flowchart of an approach for identifying a best set of discriminative URL components from sample URLs of a cluster.

FIG. 5 illustrates an approach 500 for identifying a best set of dynamic token keys from sample URLs of the current cluster based on sample URLs of one or more other clusters of a plurality of clusters. Approach 500 is similar to approach 400 in that both use a discriminative power metric such as entropy or information gain to identify a best set of dynamic token keys. However, according to one embodiment of approach 500, dynamic token keys from sample URLs of the current cluster are grouped into dynamic token key groups and a discriminative power metric is computed for each of the dynamic token key groups. Dynamic token key groups are then selected for use in generating a URL-regex for the current cluster based on the discriminative power of those dynamic token key groups. In some circumstances, approach 500 generates a URL-regex that is more discriminative or more selective than one generated by approach 400 when operating on the same set of clusters.

At step 501, dynamic token keys from sample URLs of the current cluster are combined into dynamic token key groups. Each dynamic token key group comprises one or more dynamic token keys from sample URLs of the current cluster. In one embodiment, up to but no more than MaxD dynamic token keys are grouped together in any one dynamic token key group. MaxD may be a user-adjustable parameter configurable according to application needs or requirements. In one embodiment, MaxD is relatively small number such as 3 or 5.

In one embodiment, a dynamic token key group is represented as a Boolean expression that is either true or false when evaluated against a sample URL. In cases where a dynamic token key group comprises more than one dynamic token key, the dynamic token keys of the dynamic token key group may be related disjunctively or conjunctively in the Boolean expression. The expression (k1 && k2 && k3) is an example of a Boolean expression in which dynamic token keys k1, k2, and k3 are related conjunctively. The expression (k1||k2) is an example of a Boolean expression in which keys k1 and k2 are related disjunctively. Further, multiple dynamic token keys may be related in a Boolean expression using a combination of disjunctive and conjunctive operators. For example, (k1 && (k2||k3)) is an example of a Boolean expression using both conjunctive and disjunctive operators.

At step 502, the set of dynamic token key groups produced at step 501 is pruned so that that set includes only dynamic token key groups that are satisfied by at least C % of sample URLs in the current cluster. A sample URL may be evaluated against a Boolean expression that represents a dynamic token key group to determine whether the sample URL satisfies the dynamic token key group. In one embodiment, determining whether a sample URL satisfies a dynamic token key group comprises determining whether the attribute(s) in the query string portion of the sample URL satisfy a Boolean expression representing the dynamic token key group. For example, the sample URL "http://www.example.com/path/to/file?k1=val1&k3=val2" satisfies the dynamic token key group (k1) because the attribute "k1" is present in the query string portion of the sample URL. The example sample URL also satisfies, for example, the dynamic token key groups (k1||k2) and (k1 && (k2||k3)).

At step 503, a discriminative power metric is calculated for each dynamic token key group that remains after the pruning performed in step 502. According to one or more embodiments, the discriminative power metric calculated for a dynamic token key group is based on sample URLs of one or more other clusters of a plurality of clusters of which the current cluster is a member.

In one embodiment, the discriminative power metric calculated for a given dynamic token key group is calculated as the entropy of the dynamic token key group. In one embodiment, the entropy of a dynamic token key group is calculated as follows:

$$\text{Entropy(group)} = -\sum_{i=1}^{k} P_i \log_k P_i \quad (1)$$

where:
$P_i$=The number of sample URLs in cluster i that satisfy group/total number of sample URLs in all clusters that satisfy group.
k=Total number of clusters in the plurality of clusters.

Using the entropy formula (1) above, the entropy of a dynamic token key group lies in the range 0 to 1. The lower the entropy value (i.e., the lower the entropy), the more discriminative the dynamic token key group is.

In one embodiment, the discriminative power metric for a dynamic token key group is calculated as the information gain of the dynamic token key group. In one embodiment, the information gain of the dynamic token key group is calculated as follows:

$$\text{Information Gain(group)} = \quad (2)$$
$$-\sum_{i=1}^{k} P(c_i)\log_k P(c_i) + P(\text{group})\sum_{i=1}^{k} P(c_i \mid \text{group})\log_k P(c_i \mid \text{group}) +$$
$$P(\text{group}')\sum_{i=1}^{k} P(c_i \mid \text{group}')\log_k P(c_i \mid \text{group}')$$

where:
k=Total number of clusters in the plurality of clusters.
$P(c_i)$=Total number of sample URLs in cluster $c_i$/total number of sample URLs in all clusters.
P(group)=Number of sample URLs in all clusters that satisfy group/total number of sample URLs in all clusters.
$P(c_i|\text{group})$=Number of sample URLs in cluster $C_i$ that satisfy group/total number of sample URLs in all clusters that satisfy group.
P(group')=Number of sample URLs in all clusters that do not satisfy group I total number of sample URLs in all clusters.
$P(c_i|\text{group}')$=Number of sample URLs in cluster $C_i$ that do not satisfy group/total number of sample URLs in all clusters that do not satisfy group.

At step 504, once discriminative power metrics have been calculated in step 503 for the dynamic token key groups that remain after step 502, a best set of dynamic token key groups are selected for the current cluster based on metrics calculated in step 503. In one embodiment, dynamic token key groups are selected from the remaining dynamic token key groups that have the most discriminative power according to the metrics calculated in step 503. In one embodiment, dynamic token key groups are selected that have the lowest entropy or the highest information gain. In one embodiment, only the single most discriminative dynamic token key group is selected for inclusion in the best set of dynamic token key groups.

At the end of process 500 a subset of the set of dynamic token key groups produced in step 501 has been selected based on the discriminative power of those dynamic token key groups.

Returning to step 303 of process 300, at the completion of step 303, a best set of one or more dynamic token keys from sample URLs of the current cluster have been identified using a discriminative power measurement. For example, the best set of dynamic token keys may be part of one or more dynamic token key groups as identified using a dynamic token key group approach such as approach 500 of FIG. 5. As another example, the best set of dynamic token keys may be identified using an approach such as approach 400 of FIG. 4. However, embodiments of the invention are not limited to any particular approach for identifying a best of dynamic token keys and other approach may be substituted for the approaches described herein. Further, embodiments of the invention are not limited to only entropy or information gain metrics for calculating the discriminative power of a dynamic token key or dynamic token key group and other suitable metrics or calculations may be substituted.

At step 304 of process 300, a URL-regex comprising one or more regular expression patterns is generated for the current cluster. In one embodiment, a URL-regex is generated for the current cluster according to step 204 of process 200 but using the set of static token keys identified in step 302 of process 300 and the set of dynamic token keys identified in step 403 of process 400 or the set of dynamic token key groups identified in step 504 of process 500.

In one embodiment of process 300, process 300 includes an additional step like step 203 of process 200 at which one or more static token values are selected for each of the static token keys selected in step 302. In one embodiment, the static token values that are selected in this additional step cover more than VC % of the sample URLs of the current cluster.

To illustrate process 300 by an example, consider the following set of sample URLs that, according to one embodiment, belong to the same cluster:

```
1: http://reviews.example.com/5420-
30000.html?forumID=104&threadID=171964&messageID=2008012
2: http:// reviews.example.com/5420-6028__7-
0.html?forumID=104&messageID=1406517&threadID=124148
3: http:// reviews.example.com/5420-3513__7-
0.html?forumID=104&messageID=1628138&threadID=131174
4: http:// reviews.example.com/5530-10921-0-
10.html?forumID=110&threadID=217654&messageID=2322554
5: http:// reviews.example.com/5530-10921__7-0-
10.html?forumID=110&messageID=2122973&threadID=182970
6: http:// reviews.example.com/5420-6028__7-
0.html?forumID=104&messageID=1406509&threadID=124148
7: http:// reviews.example.com/5530-10921-0-
10.html?forumID=110&threadID=121584&messageID=1380468
8: http:// reviews.example.com/5530-10921-0-
10.html?forumID=110&threadID=206158&messageID=2353973
9: http:// reviews.example.com/5420-6449__7-
0.html?forumID=104&messageID=2409047&threadID=222111
10: http:// reviews.example.com/5420-6463-
0.html?forumID=104&threadID=169542&messageID=2491108
```

According to one embodiment of process 300, the following URL-regex is generated for the above cluster of sample URLs:

https?://reviews\.cnet\.com(.*?)/?\?(.*?)
(forumID=|threadID=)(.*?)

3.3.3 An Approach for Generating a URL-Regex Pattern for a Cluster

Figure 6A:
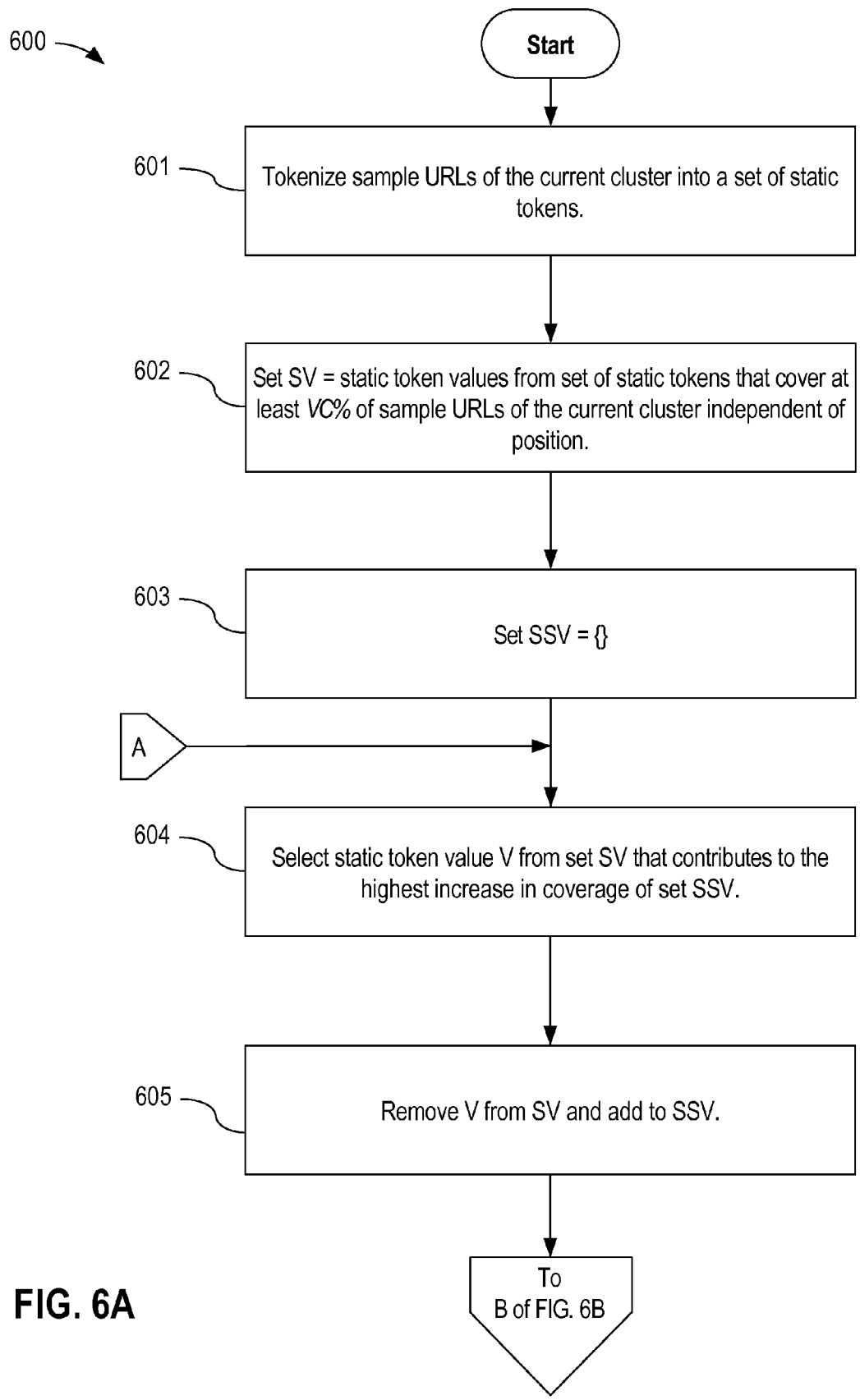
FIG. 6 is a flowchart of an approach for generating a URL-regex pattern for a cluster.
Figure 6B:
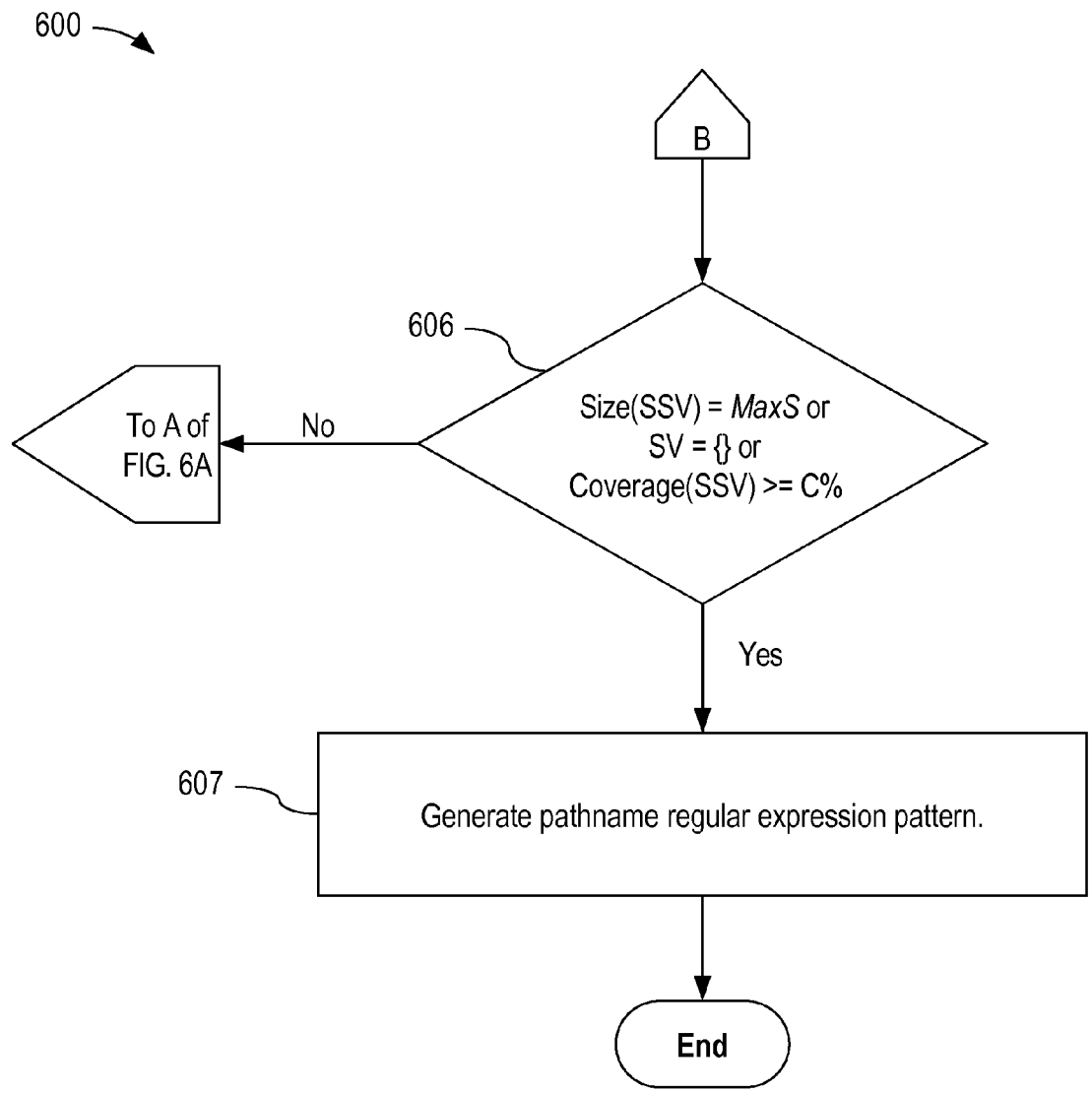

FIG. 6 illustrates an approach 600 for generating a URL-regex pattern for a cluster according to one or more embodiments of the invention. Approach 600 may be used in the event that another approach such as approach 300 of FIG. 3 generates a URL-regex pattern for a cluster that is too generic and thus is insufficiently selective. A URL-regex pattern may be too generic if, for example, it comprises only a hostname regular expression pattern or a generic pathname regular expression pattern or a generic query string regular expression pattern. An approach may generate a URL-regex pattern that is too generic when, for example, no or few static token keys or no or few dynamic token keys are selected because the coverage parameter C % is configured to be too restrictive.

In one embodiment, approach 600 produces a pathname regular expression pattern that may be combined with a hostname regular expression pattern or a query string regular expression pattern produced by another approach to form a URL-regex. For example, a query string regular expression produced according to approach 300 may be combined with a pathname regular expression produced according to approach 600 to form a URL-regex for a cluster.

In general, approach 600 aims to increase the selectively of a URL-regex by relaxing the conditions under which static tokens are selected for use in generating the pathname regular expression pattern portion of the URL-regex. Approach 600 may be performed once for each cluster of a plurality of clusters to produce a pathname regular expression pattern for each cluster.

At step 601, sample URLs of the current cluster are tokenized to produce a single set of static tokens. In one embodiment, sample URLs are tokenized according to an approach described previously with respect to step 201 of process 200. In another embodiment, the set of static tokens comprises only pathname components or deep tokens as identified by a deep tokenization process and does not include any information about the position of the pathname components or the position of the deep tokens within the pathname portions of the sample URLs.

At step 602, static token values are selected from the set of static tokens that cover at least VC % of the sample URLs of the current cluster. In one embodiment, static token values are selected independent of the position in the pathname portions of the sample URLs where the static token values are found. For example, the static token value "product" would cover all three of the following sample URLs even though the URL component "product" occurs in three different positions amongst the three sample URLs:

```
http://www.example.com/review/product/B0022HU4Y
http://www.example.com/product/review/B00F1HGU6
http://www.example.com/review/B00136RW24/product
```

The set of static token values selected at step 602 is referred to hereinafter as the set SV.

At step 603, the set SSV (Selected Static Values) is set to the empty set. Set SSV, when populated, represents the set of static token values to be used to generate a pathname regular expression pattern for the current cluster.

Steps 604, 605, and 606 are performed in a loop until one of the three conditions of step 606 is met. At step 604, a static token value is selected from the set SV that contributes to the highest increase in coverage of the sample URLs of the current cluster by the static token keys in set SSV. According to one embodiment, coverage by set SSV is measured by calculating the percentage of sample URLs in the current cluster that contain all of the static token values in set SSV in the pathname portions of the sample URLs irrespective of the positions at which the static token values are found in the pathname portions of the sample URLs.

At step 605, the static token value selected at step 604 that contributes to the highest increase in coverage by set SSV is removed from set SV and added to set SSV.

The loop of steps 604, 605, and 606 terminates at step 606 when either: the number of static token values in set SSV exceeds a specified threshold parameter (MaxS), set SV is empty, or the set SSV covers at least C % of the sample URLs in the current cluster. If none of those conditions are met, then process 600 returns to step 604 to select a next static token value from set SV. In one embodiment, MaxS is a user-configurable parameter that may be adjusted based on application requirements or needs.

At step 607, a pathname regular expression pattern is generated based on the static token values in set SSV. In one embodiment, the pathname regular expression pattern is generated by concatenating each of the static token values in set SSV in the alternative using an alternative operator such as '|'.

To illustrate process 600 by an example, the following set of sample URLs may be considered:

1: http://www.example.com/exec/obidos/ISBN=0131038052/martyhallsrecomm/
2: http://www.example.com/exec/obidos/ASIN/0735605866/isysinformationa
3: http://www.example.com/exec/obidos/ASIN/B00003J6I0/duetlucapianc-20
4: http://www.example.com/gp/product/B000V8E1B0
5: http://www.example.com/gp/product/B000OCZD5G
6: http://www.example.com/gp/product/B000SYYNWY
7: http://www.example.com/gp/product/038548254X
8: http://www.example.com/review/product/B000F1HGU6
9: http://www.example.com/gp/product/B00136RW24
10: http://www.example.com/gp/product/images/B00213JM9O?ie=UTF8&img=2

According to one embodiment, process 600 generates the following pathname regular expression pattern from the set of sample URLs above:

/(.*?)(dp/|obidos/|product/)

The above example pathname regular expression pattern could be combined with a hostname regular expression pattern to generate the following URL-regex:

https?://www\.example\.com/(.*?)(dp/|obidos/|product/)

To illustrate process 600 by another example, the following set of sample URLs may be considered:

1: http://www.example.com/catalog/101407608/Business_Suits.html
2: http://www.example.com/product/gennadymosk-11529492-10968565/Working_Boots.html
3: http://www.example.com/product/gennadymosk-11529492-10968565/Working_Boots.html
4: http://www.example.com/catalog/217063486/pants.html
5: http://www.example.com/catalog/217063486/pants.html
6: http://www.example.com/product/yuyanmei-104140908-100778719/High_power_LED_Emitter_Batwing_bulbs.html
7: http://www.example.com/product/yaempaopp-100016762-11130504/Canopy_For_Triton_L200_Automobile.html
8: http://www.example.com/product/yaempaopp-100016762-11130504/Canopy_For_Triton_L200_Automobile.html
9: http://www.example.com/offerdetail/101970991/pre_boned_tipped_human_hair_extensions.html
10: http://www.example.com/offerdetail/101970991/pre_boned_tipped_human_hair_extensions.html According to one embodiment, process 600 generates the following pathname regular expression pattern from this example second set of sample URLs:

/(catalog/|offerdetail/|product/)(.*?)\.html

This pathname regular expression pattern could be combined with a hostname regular expression pattern to generate the following URL-regex:

https?://www\.example\.com/(catalog/|offerdetail/|product/)(.*?)\.html

Various approaches have been described for generating a URL-regex for a cluster. In the description, for the purposes of explaining embodiments of the present invention, references are made to flowcharts that outline steps of various processes. It will be apparent to one skilled in the art, however, that other embodiments of the present invention may be practiced without some of the steps shown in the flowcharts or by performing steps in a different order than is shown in the flowcharts.

3.4 Categorizing a Web Page

Returning to step 102 of process 100, at the completion of step 102, a URL-regex has been generated for each cluster of a plurality of clusters. With these URL-regex patterns generated, a given URL may be categorized into one of the clusters by evaluating the URL against the URL-regex patterns until a match is made.

At step 103 of process 100, a received URL referring to a web page is categorized into one of the plurality of clusters based on the received URL. In one embodiment, this involves evaluating the received URL against each URL-regex generated for each cluster until a match is made. Evaluation of a URL against a URL-regex pattern may be performed using methods known in the art for evaluating a string against a regular expression pattern. For example, in one embodiment, evaluation of URL against a URL regex pattern involves passing both a string representing the URL and a string representing the URL-regex pattern to a software implemented sub-routine, process, or function. The sub-routine, process, or function returns, as a result, an indication of whether the given URL-regex pattern matches the given URL string. The URL may be received in virtually any manner such as, for example, in a request from a client computer or having been obtained from a database.

In one embodiment, each cluster of the plurality of clusters is associated with one or more rules or actions. At step 104, in response to matching the received URL to a cluster of the plurality of clusters, the one or more rules or actions associated with the matched cluster are applied. The rules or actions associated with a cluster can be virtually any computer-executable rule or action. For example, a rule might specify content (e.g., a name, an address, a telephone number, hours of operation, a rating, a product price, etc.) to extract from the web page referred to by the received URL. As another example, a rule might specify an advertisement to be displayed in conjunction with display of the web page referred to by the received URL.

4.0 Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 7:
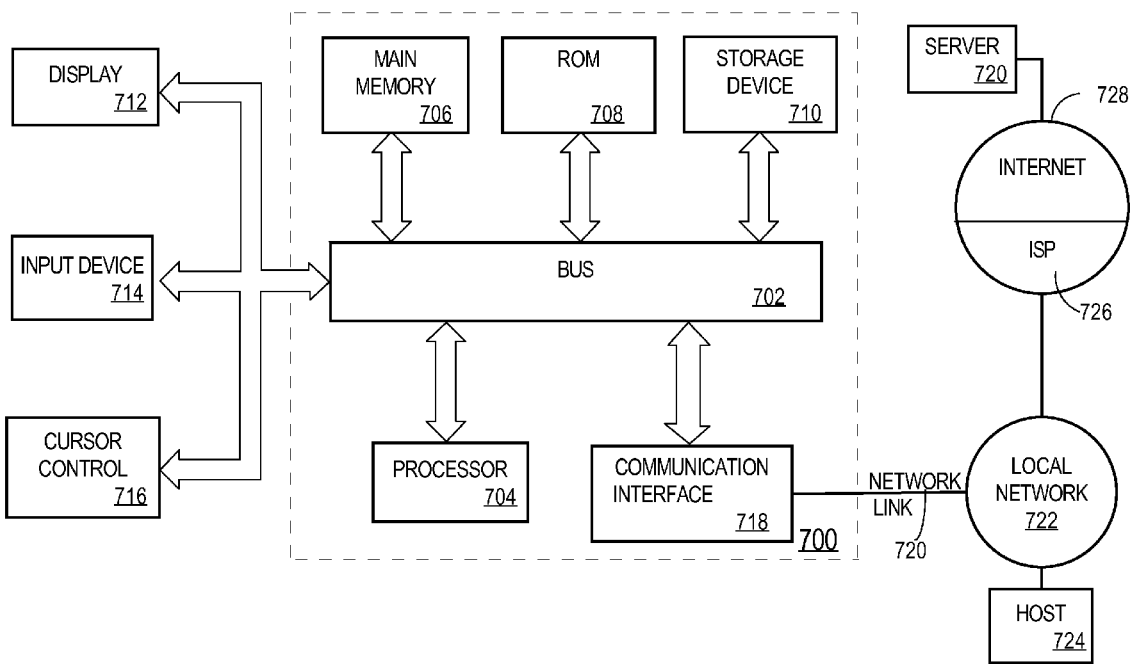
FIG. 7 is a very general block diagram of a computer system in which processes of the present invention may be embodied.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any media that store data and/or instructions that cause a machine to operation in a specific fashion. Such storage media may comprise non-volatile media and/or volatile media. Non-volatile media includes, for example, optical or magnetic disks, such as storage device 710. Volatile media includes dynamic memory, such as main memory 706. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

5.0 Conclusion

Embodiments of the present invention comprise systems and methods to facilitate the categorization of web pages in real-time. The embodiments solve several problems faced by web sites that provide web pages or web page content based on web pages of other web sites, such as how to efficiently determine which of many possible actions apply to a specified web page.

Embodiments of the present invention enable a web site to not only categorize a web page but to do so without having to analyze the content of the web page. A web site may employ embodiments of the invention to efficiently categorize a specified web page. Further, a web site may employ embodiments of the invention to quickly determine, based on the categorization, which of many possible actions apply to the categorized web page. For example, a search engine web site may employ embodiments of the invention when indexing web pages on the Web to determine which of many possible content extraction rules apply to a particular indexed web page. As another example, an advertising web site may employ embodiments of the invention to determine which of many possible advertisements to display on a specified web page.

Embodiments of the invention include techniques for identifying discriminative and selective URL components from the sample URLs of a cluster so that the possibility that any given URL matches more than URL-regex is reduced. Further, in one or more embodiments of the invention, URL-regex patterns are optimized so that time spent matching a new URL to a URL-regex is reduced.

Embodiments of the invention include tunable parameters that affect the coverage of a produced URL-regex based on application requirements or needs. Further, embodiments of the invention include tunable parameters that affect the complexity of produced URL-regex patterns based on application requirements or needs.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
    maintaining data that represents sets of Uniform Resource Locators (URLs), each set of said sets comprising a plurality of URLs, the plurality of URLs of each set of said sets having one or more of: similarity between the plurality of URLs, or similarity between web pages referred to by the plurality of URLs;
    for at least one set of said sets,
        selecting a plurality of URL components from query string portions of URLs in the at least one set;
        for each of the plurality of URL components, computing a discriminative value based on URLs from one or more other sets of said sets;
        wherein a particular discriminative value, computed for a particular URL component of the plurality of URL components, is based on one of:
            (I) an entropy value of the particular URL component, wherein the lower the entropy value, the more the particular URL component discriminates between (a) URLs that belong to the at least one set and (b) URLs that belong to the one or more other sets of said sets, or
            (II) an information gain value for the particular URL component, wherein the higher the information gain value, the more the particular URL component discriminates between (a) URLs that belong to the at least one set and (b) URLs that belong to the one or more other sets of said sets;
        selecting a subset of URL components, from the plurality of URL components, based on how much the subset of URL components discriminate between (a) URLs that belong to the at least one set and (b) URLs that belong to the one or more other sets of said sets, as indicated by the computed discriminative values;
        wherein the subset of URL components includes less URL components than the plurality of URL components; and
        generating a particular regular expression based on said subset;
    receiving a URL that refers to a web page; and
    determining whether said received URL matches said generated particular regular expression;
    wherein the method is performed by one or more computing devices.

2. The method of claim 1, wherein the at least one set is associated with one or more rules, the method further comprising:
    determining that said received URL matches said generated particular regular expression; and
    in response to determining that said received URL matches said generated particular regular expression, applying the one or more rules associated with the at least one set.

3. The method of claim 2, wherein applying said one or more rules associated with the at least one set comprises extracting information from the web page referred to by the received URL.

4. The method of claim 1, wherein selecting a plurality of URL components from query string portions of URLs in the at least one set comprises selecting URL components, to be part of the plurality of URL components, that are common to at least a specified percentage of URLs in the at least one set.

5. The method of claim 1, wherein the particular discriminative value, computed for the particular URL component of the plurality of URL components, is based on the entropy value of the particular URL component.

6. The method of claim 1, wherein the particular discriminative value, computed for the particular URL component of the plurality of URL components, is based on the information gain value for the particular URL component.

7. The method of claim 1, wherein:
    the particular computed discriminative value is a measurement of discriminative power of the particular URL component; and
    selecting a subset of URL components from the plurality of URL components is based on which of the plurality of URL components have the most discriminative power as evidenced, at least in part, by the discriminative values computed for the plurality of URL components.

8. The method of claim 1, further comprising:
selecting a second plurality of URL components from URLs in a second set of said sets;
for each of the second plurality of URL components, computing a discriminative value based on URLs from one or more other sets of said sets;
based on the computed discriminative values for the second plurality of URL components, selecting a second subset of URL components from the second plurality of URL components; and
generating a second regular expression based on said second subset;
receiving a second URL that refers to a second web page;
determining whether said second received URL matches said second generated regular expression; and
in response to determining that said second received URL matches said second generated regular expression, applying, to the second web page referred to by the second received URL, one or more rules associated with the second set.

9. The method of claim 8, further comprising:
determining whether said second received URL matches said generated particular regular expression; and
performing said determining whether said second received URL matches said second generated regular expression in response to determining that said second received URL does not match said generated particular regular expression.

10. A method comprising:
maintaining data that represents sets of Uniform Resource Locators (URLs), each set of said sets comprising a plurality of URLs, the plurality of URLs of each set of said sets having one or more of: similarity between the plurality of URLs, or similarity between web pages referred to by the plurality of URLs;
for at least one set of said sets,
  generating a plurality of URL component groups based on URLs in the at least one set, wherein each of the plurality of URL component groups comprises one or more URL components from query string portions of URLs in the at least one set, wherein at least one of the plurality of URL component groups comprises a plurality of URL components from query string portions of URLs in the at least one set;
  for each of the URL component groups in a first subset of the plurality of URL component groups, computing a discriminative value based on URLs from one or more other sets of said sets;
  wherein a particular discriminative value, computed for a particular URL component group of the plurality of URL component groups, is based on one of:
    (I) an entropy value of the particular URL component group, wherein the lower the entropy value, the more the particular URL component group discriminates between (a) URLs that belong to the at least one set and (b) URLs that belong to the one or more other sets of said sets, or
    (II) an information gain value for the particular URL component group, wherein the higher the information gain value, the more the particular URL component group discriminates between (a) URLs that belong to the at least one set and (b) URLs that belong to the one or more other sets of said sets;
  selecting a second subset of URL component groups, from the first subset, based on how much the second subset of URL component groups discriminate between (a) URLs that belong to the at least one set and (b) URLs that belong to the one or more other sets of said sets, as indicated by the computed discriminative values;
  wherein the second subset of URL component groups includes less URL component groups than the first subset of URL component groups; and
  generating a regular expression based on said second subset;
receiving a URL that refers to a web page; and
determining whether said received URL matches said generated regular expression;
wherein the method is performed by one or more computing devices.

11. The method of claim 10,
wherein each URL component group, of the plurality of URL component groups, is represented as a Boolean expression;
wherein the Boolean expression, for each of the URL component groups in the first subset of URL component groups, is satisfied by at least a specified percentage of URLs in the at least one set.

12. The method of claim 10, wherein:
the particular computed discriminative value is a measurement of discriminative power of the particular URL component group; and
selecting the second subset of URL component groups, from the first subset of URL component groups, is based on which of the plurality of URL component groups have the most discriminative power as evidenced, at least in part, by the discriminative values computed for the plurality of URL component groups.

13. One or more non-transitory computer-readable storage media storing instructions which, when executed by one or more processors, cause:
maintaining data that represents sets of Uniform Resource Locators (URLs), each set of said sets comprising a plurality of URLs, the plurality of URLs of each set of said sets having one or more of: similarity between the plurality of URLs, or similarity between web pages referred to by the plurality of URLs;
for at least one set of said sets,
  selecting a plurality of URL components from query string portions of URLs in the at least one set;
  for each of the plurality of URL components, computing a discriminative value based on URLs from one or more other sets of said sets;
  wherein a particular discriminative value, computed for a particular URL component of the plurality of URL components, is based on one of:
    (I) an entropy value of the particular URL component, wherein the lower the entropy value, the more the particular URL component discriminates between (a) URLs that belong to the at least one set and (b) URLs that belong to the one or more other sets of said sets, or
    (II) an information gain value for the particular URL component, wherein the higher the information gain value, the more the particular URL component discriminates between (a) URLs that belong to the at least one set and (b) URLs that belong to the one or more other sets of said sets;
  selecting a subset of URL components, from the plurality of URL components, based on how much the subset of URL components discriminate between (a) URLs that belong to the at least one set and (b) URLs that belong to the one or more other sets of said sets, as indicated by the computed discriminative values;

wherein the subset of URL components includes less URL components than the plurality of URL components; and generating a particular regular expression based on said subset;

receiving a URL that refers to a web page; and determining whether said received URL matches said generated particular regular expression.

14. The one or more non-transitory computer-readable storage media of claim 13, wherein the at least one set is associated with one or more rules, the computer-readable storage medium further comprising instructions for:

determining that said received URL matches said generated particular regular expression; and in response to determining that said received URL matches said generated particular regular expression, applying the one or more rules associated with the at least one set.

15. The one or more non-transitory computer-readable storage media of claim 14, wherein applying said one or more rules associated with the at least one set comprises extracting information from the web page referred to by the received URL.

16. The one or more non-transitory computer-readable storage media of claim 13, wherein selecting a plurality of URL components from query string portions of URLs in the at least one set comprises selecting URL components, to be part of the plurality of URL components, that are common to at least a specified percentage of URLs in the at least one set.

17. The one or more non-transitory computer-readable storage media of claim 13, wherein the particular discriminative value, computed for the particular URL component of the plurality of URL components, is based on the entropy value of the particular URL component.

18. The one or more non-transitory computer-readable storage media of claim 13, wherein the particular discriminative value, computed for the particular URL component of the plurality of URL components, is based on the information gain value for the particular URL component.

19. The one or more non-transitory computer-readable storage media of claim 13, wherein:

the particular computed discriminative value is a measurement of discriminative power of the particular URL component; and selecting a subset of URL components from the plurality of URL components is based on which of the plurality of URL components have the most discriminative power as evidenced, at least in part, by the discriminative values computed for the plurality of URL components.

20. The one or more non-transitory computer-readable storage media of claim 13 further comprising instructions for:

selecting a second plurality of URL components from URLs in a second set of said sets;

for each of the second plurality of URL components, computing a discriminative value based on URLs from one or more other sets of said sets;

based on the computed discriminative values for the second plurality of URL components, selecting a second subset of URL components from the second plurality of URL components; and generating a second regular expression based on said second subset;

receiving a second URL that refers to a second web page;

determining whether said second received URL matches said second generated regular expression; and in response to determining that said second received URL matches said second generated regular expression, applying, to the second web page referred to by the second received URL, one or more rules associated with the second set.

21. The one or more non-transitory computer-readable storage media of claim 20, further comprising instructions for:

determining whether said second received URL matches said generated particular regular expression; and performing said determining whether said second received URL matches said second generated regular expression in response to determining that said second received URL does not match said generated particular regular expression.

22. One or more non-transitory computer-readable storage media storing instructions which, when executed by one or more processors, cause :

maintaining data that represents sets of Uniform Resource Locators (URLs), each set of said sets comprising a plurality of URLs, the plurality of URLs of each set of said sets having one or more of: similarity between the plurality of URLs, or similarity between web pages referred to by the plurality of URLs;

for at least one set of said sets, generating a plurality of URL component groups based on URLs in the at least one set, wherein each of the plurality of URL component groups comprises one or more URL components from query string portions of URLs in the at least one set, wherein at least one of the plurality of URL component groups comprises a plurality of URL components from query string portions of URLs in the at least one set;

for each of the URL component groups in a first subset of the plurality of URL component groups, computing a discriminative value based on URLs from one or more other sets of said sets;

wherein a particular discriminative value, computed for a particular URL component group of the plurality of URL component groups, is based on one of:

(I) an entropy value of the particular URL component group, wherein the lower the entropy value, the more the particular URL component group discriminates between (a) URLs that belong to the at least one set and (b) URLs that belong to the one or more other sets of said sets, or (II) an information gain value for the particular URL component group, wherein the higher the information gain value, the more the particular URL component group discriminates between (a) URLs that belong to the at least one set and (b) URLs that belong to the one or more other sets of said sets;

selecting a second subset of URL component groups, from the first subset, based on how much the second subset of URL component groups discriminate between (a) URLs that belong to the at least one set and (b) URLs that belong to the one or more other sets of said sets, as indicated by the computed discriminative values;

wherein the second subset of URL component groups includes less URL component groups than the first subset of URL component groups; and generating a regular expression based on said second subset;

receiving a URL that refers to a web page; and determining whether said received URL matches said generated regular expression.

23. The one or more non-transitory computer-readable storage media of claim 22, wherein each URL component group, of the plurality of URL component groups, is represented as a Boolean expression;

wherein the Boolean expression, for each of the URL component groups in the first subset of URL component groups, is satisfied by at least a specified percentage of URLs in the at least one set.

24. The one or more non-transitory computer-readable storage media of claim 22, wherein:

the particular computed discriminative value is a measurement of discriminative power of the particular URL component group; and selecting the second subset of URL component groups, from the first subset of URL component groups, is based on which of the plurality of URL component groups have the most discriminative power as evidenced, at least in part, by the discriminative values computed for the plurality of URL component groups.

\* \* \* \* \*